Feb. 16, 1926. 1,573,774

A. W. NORDGREN

FASTENER FOR SUPPORTING ARMS FOR BUMPERS

Filed Oct. 27, 1924

Inventor
Algot W. Nordgren
By Bair & Freeman
Attorney

Witness

Patented Feb. 16, 1926.

1,573,774

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

FASTENER FOR SUPPORTING ARMS FOR BUMPERS.

Application filed October 27, 1924. Serial No. 746,104.

*To all whom it may concern:*

Be it known that I, ALGOT W. NORDGREN, a citizen of the United States, residing at St. Paul, in the county of Ramsey and State of Minnesota, have invented a certain new and useful Fastener for Supporting Arms for Bumpers, of which the following is a specification.

The object of my invention is to provide means for fastening the supporting arms of a combination fender brace and bumper to the chassis of an automobile with the use of a minimum number of parts, and without the necessity of any special tools or the like.

Still a further object is to provide a fastener adapted to coact with a standard part of the automobile chassis and coact with the supporting arms, whereby one bolt will connect the fastener to the chassis and retain it against any pivotal movement, and to use a single bolt for connecting the fastener to each supporting arm where the interfitting of parts will retain it against any undesired rotary movement.

Still a further object is to provide an L-shaped clip adapted to coact with the supporting arm and with a permanent part of the chassis, whereby the supporting arm will be securely connected to the chassis itself, utilizing a bolt already forming a part of the equipment of the automobile.

Still a further object is to provide the parts so that the supporting arms will rest against a portion of the chassis of the automobile in such position that when the fastener is installed, the abutting of the supporting arms against the chassis, will also help prevent any undesired movement of the supporting arms.

Still a further object is to provide a fastener whereby its position can be shifted upon the supporting arms so that the combination fender brace and bumper may be secured to different models of the same kind of an automobile.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
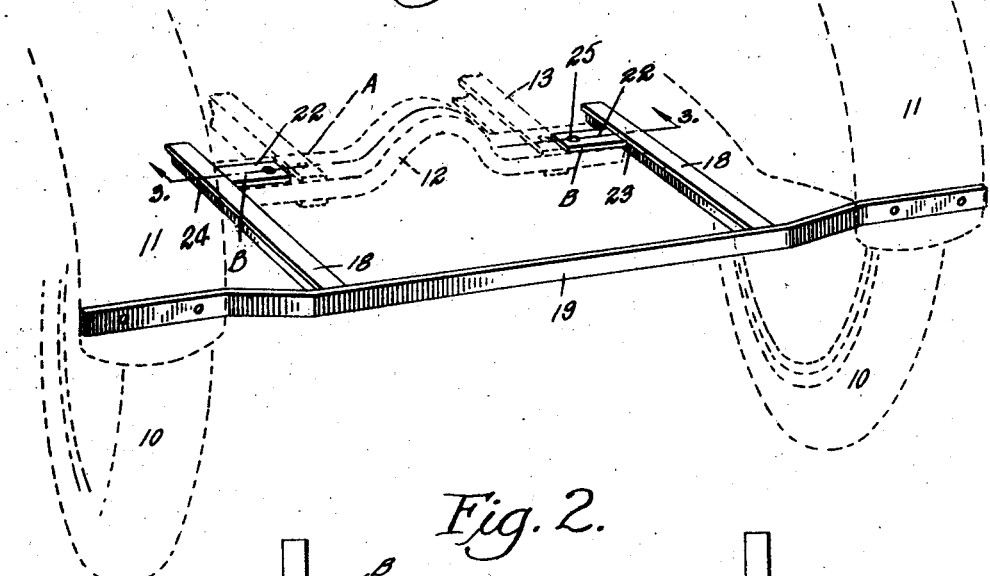
Figure 1 is a perspective view of my improved fastener for a combination fender brace and bumper, the chassis, fenders and wheels of the automobile being shown in dotted lines.
Figure 2:
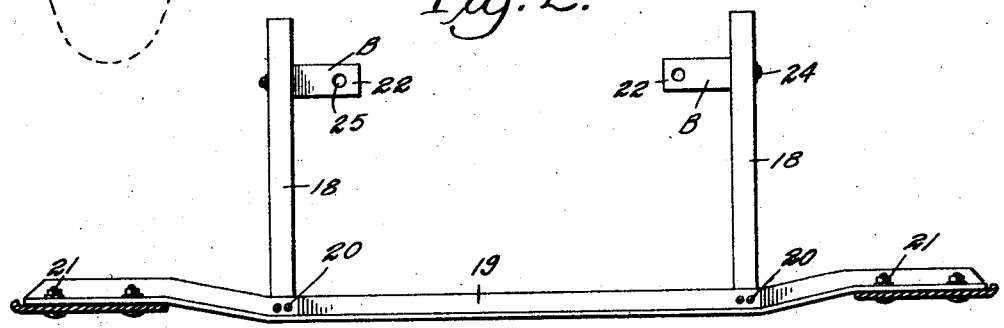
Figure 2 is a top, plan view of a combination fender brace and bumper with my improved fastener shown thereon.

In the accompanying drawings, I have used the reference numeral 10 to indicate generally the rear wheels of an automobile with mud guards or fenders 11 spaced thereabove.

The automobile includes a chassis A comprising a channel shaped bar 12 opening downwardly.

The bar 12 has fastened to it a pair of longitudinal beams, channel shaped in cross section, 13.

The beams or frame 13 open inwardly, that is, the two beam members 13 open toward each other.

Portions of the connecting web of the two side flanges of the channel shaped frame members 13 are cut away so as to receive therebetween the bar 12.

Figure 3:
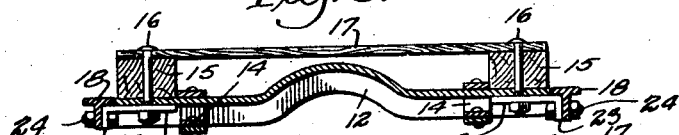
Figure 3 is a detail, sectional view taken along the line 3—3 of Figure 1.

A small fitting 14 is placed in the bar 12 for permitting the lower flange portion of the frame 13 to be riveted thereto, as clearly shown in Figure 3 of the drawings.

The parts just described are the ordinary frame or chassis of a Ford automobile.

The bar or brace 12 has its ends project beyond the frame members 13, as clearly shown in Figure 1 of the drawings.

Supporting sills 15 rest upon the cross brace or bar 12 and are secured thereto by the bolts 16.

Flooring boards 17 connect two sills 15 together all of which is the ordinary construction.

It may be here mentioned that it is quite desirable to connect the fenders of a Ford type automobile together, and to connect the fenders at their outer, rear ends to the automobile body or chassis through the medium of the supporting arms and portions or parts of the bumper member itself, and a combination fender brace and bumper structure is illustrated in the W. H. Thomas Patent No. 1,379,946, dated May 31, 1921, and the patent to Edward L. Moore, No, 1,509,746, dated September 23, 1924.

The combination fender brace and bumper includes supporting arms 18 formed of T iron, although angle iron may be equally as well used.

The supporting arms 18 are connected to a bumper brace member 19 by bolts or rivets 20, which extend through one flange of the bumper brace 19 and through one flange of the supporting arms 18.

The ends of the bumper brace 19 extend beyond the supporting arms 18 and directly underneath the fenders 11. The fenders 11 are connected to the bumper brace 19 by the bolts 21.

The bumper brace 19 may project in the rear of the fenders, as illustrated in the Moore patent hereinbefore referred to.

My improved fastener for each supporting arm comprises a clip B. The clip B is angular shaped, that is, it is provided with a main body portion 22 having a right angle extension or flange 23 formed thereon.

Figures 4, 5, 6:
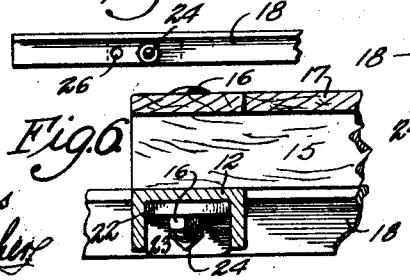
Figure 4 is a detail view of one of the supporting arms showing the different bolt openings therein.
Figure 5 is an enlarged, detail, sectional view showing the bolt for connecting the fastener to the chassis.
Figure 6 is a sectional view taken on the line 6—6 of Figure 5.

The portion 22 of the clip B is designed to extend in between the down turned flanges of the channel shaped cross brace 12, and to rest against the underside of the horizontal connecting web of the cross brace, as clearly shown in detail in Figure 5 of the drawings.

One flange of the supporting arm 18 is designed to abut against the outer edge of the connecting web of the cross brace 12 and extend at right angles thereto, as clearly shown in Figure 5 of the drawings.

The flange 23 of the clip B rests against one flange of the supporting arm 18 and is secured thereto by a bolt 24. The supporting arms 18 are T shaped in cross section and provide a right angled corner against which the angle of the clip B may abut so that when the single bolt 24 is in position, the clip B will be held against any undesired rotary movement relative to the supporting arm 18.

The width of the horizontal portion 22 of the clip B is such that it is snugly received between the down-turned flanges of the cross brace 12.

The portion 22 of the clip B is formed with a bolt opening 25 through which is extended the bolt 16.

The nut on the bolt 16 is removed for permitting the portion 22 of the clip B to be positioned with the opening 25 receiving the bolt and thereafter when the nut is replaced in original position, it supports the clip B in proper position.

It will thus be seen that a single bolt is utilized for supporting the clip B and the fact that the clip coacts with the cross brace 12 enables me by use of a single bolt to securely anchor the clip B to the chassis and to support the combination fender brace and bumper in proper position.

It may be here mentioned that in the various models of the Ford make of automobile, the fenders are positioned somewhat farther back from the cross brace 12 than in others and I provide several openings 26 in the supporting arms 18, which openings receive the bolts 24.

By changing the position of the bolt 24 and the clip B relative to the supporting arm 18, I am able to have the bumper bar fastened to the fenders on different models of the Ford automobile.

The advantage of my structure resides in the fact that I utilize the standard parts of the automobile and associate them with my combination fender brace and bumper by the use of the fastener clip B.

Some changes may be made in the construction and arrangement of the various parts of my invention, without departing from the real spirit and purpose of my invention, and it is my intention to cover by claims, any modified forms of structure or use of mechanical equivalents which may be reasonably included within their scope.

I claim as my invention:

1. The combination of a channel shaped automobile cross brace having its connecting web horizontally disposed and its flanges vertically disposed and extending downwardly from the connecting web and a supporting arm having a horizontal flange and a vertical flange, with an angular fastener for securing the supporting arm to the cross brace, the edge of the horizontal flange of the supporting arm resting against the edge of the connecting web of the cross brace and having its under surface flush with the under surface of said web, said angular member resting against the horizontal and vertical flanges of the supporting arm and extending into the channel shaped cross brace and resting against the under side of the connecting web and a single element for securing the angular member to the cross brace.

2. The combination of an automobile having a chassis provided with a channel shaped cross brace and a supporting arm having a horizontal flange and a vertical flange, the horizontal flange resting against the end of horizontal portion of the cross brace and a fastener for connecting the supporting arm to the cross brace comprising an angular member arranged to have one portion rest against the vertical flange of the supporting arm and the other portion rest against the horizontal flange of the supporting arm and the horizontal portion of the cross brace.

Des Moines, Iowa, October 21, 1924.

ALGOT W. NORDGREN.